US012566258B2

(12) United States Patent
Tarar et al.

(10) Patent No.: US 12,566,258 B2
(45) Date of Patent: Mar. 3, 2026

(54) SYSTEM AND METHOD OF FULLY POLARIMETRIC PULSED RADAR

(71) Applicant: Xtract One Technologies Inc., Toronto (CA)

(72) Inventors: Munir Ahmad Tarar, Mississauga (CA); Nevine Demitri, Toronto (CA); Reza Mousavi, Markham (GB); Diogo Dutra, Toronto (CA); Farhan Naeem, Mississauga (CA)

(73) Assignee: XTRACTONE TECHNOLOGIES INC.

( * ) Notice: Subject to any disclaimer, the term of this patent is extended or adjusted under 35 U.S.C. 154(b) by 388 days.

(21) Appl. No.: 18/295,233

(22) Filed: Apr. 3, 2023

(65) Prior Publication Data

US 2024/0111044 A1    Apr. 4, 2024

Related U.S. Application Data

(60) Provisional application No. 63/326,298, filed on Apr. 1, 2022.

(51) Int. Cl.
| | |
|---|---|
| *G01S 13/88* | (2006.01) |
| *G01S 7/02* | (2006.01) |
| *G01S 7/28* | (2006.01) |
| *G01S 7/282* | (2006.01) |
| *G01S 7/41* | (2006.01) |
| *G01S 13/04* | (2006.01) |

(52) U.S. Cl.
CPC ............ *G01S 13/887* (2013.01); *G01S 7/024* (2013.01); *G01S 7/282* (2013.01); *G01S 7/412* (2013.01); *G01S 13/04* (2013.01)

(58) Field of Classification Search
None
See application file for complete search history.

(56) References Cited

U.S. PATENT DOCUMENTS

| | | | |
|---|---|---|---|
| 2007/0126561 A1* | 6/2007 | Breed | ................. B60R 25/2081 |
| | | | 340/426.13 |
| 2018/0219286 A1* | 8/2018 | Lee | ...................... H01Q 3/2682 |
| 2021/0063120 A1* | 3/2021 | Taveniku | ............. G06V 10/764 |

* cited by examiner

*Primary Examiner* — Robert W Hodge
*Assistant Examiner* — Brandon James Henson

(57) ABSTRACT

A system and method of threat detection using a pulsed polarimetric radar system using microwave range of frequencies in the electromagnetic spectrum. The system uses a radar principle to transmit and receive the scattered response from the target. A time pulsed upconverted frequency system is used to sample the target over a specified radio frequency (RF) bandwidth. The full 2-port scattering matrix (comprising all co and cross s-parameters) is captured using only one antenna with an OMT and delay lines, that represent the target. Several decompositions are used to describe the polarimetric signature of the target. The system uses polarimetric approaches to measure scattering properties of anomalous object concealed beneath clothing. The co-polarized and cross-polarized signals are analyzed to determine if a person is carrying an anomalous object beneath their clothing.

10 Claims, 12 Drawing Sheets

Architecture 4 Full polarimetric with T/x, power divider, delay line, and couplers

| Link budget | PulseRadar Output | Filters/atm | mixer LiC | HPA3-1 | HPA3-2 | BPF | power divider | 3M cable | Linear single-pol horn gain | EIRP Average/18MHz | EIRP Peak/500Hz |
|---|---|---|---|---|---|---|---|---|---|---|---|
| | -98.5 | -11 | -9.5 | 20 | 8 | -0.3 | -4.2 | -2 | 24.4 | -23.3 | -4.31 |

| Frequency Range | |
| --- | --- |
| Wide band 18-26 GHz | Narrow band 24.24.25 GHz |

(System Calibration)

| | Wide band 18-26 GHz | Narrow band 24.24.25 GHz |
| --- | --- | --- |
| ON | ON | ON |
| OFF | OFF | OFF |

SYSTEM AND METHOD OF FULLY POLARIMETRIC PULSED RADAR

CROSS REFERENCE TO RELATED APPLICATIONS

The application claims priority to and the benefit of U.S. Utility Patent Application Ser. No. 63/326,298, entitled "SYSTEM AND METHOD OF FULLY POLARIMETRIC PULSED RADAR", filed on Apr. 1, 2022, the disclosure of which are incorporated herein by reference in their entirety.

BACKGROUND

The embodiments described herein relate to security and surveillance, in particular, technologies related to the detection of concealed threats.

Polarimetric systems generally are implemented with independent transmit and receive signal paths. In many systems, these signals are transmitted as pulsed polarized RF signals. These signals are transmitted towards the target, object, or person that is being investigated for threats. Traditional systems often employ two different types of antennae at different polarization angles, commonly horizontal and vertical polarization.

Each polarization provides different excitation of the target area or volume, which in turn can produce different signals at the receive antennas. The receive antennas are also typically polarized, and information about all four quadrants—vertical to vertical, vertical to horizontal, horizontal to vertical, and horizontal to horizontal are measured. The measurements are then evaluated to be similar or dissimilar to objects of interest such as weapons, contraband materials, or other objects. Transmit antennae are often abbreviated as Tx, and receive antennae are often abbreviated as Rx. In addition, horizontal and vertical polarizations are abbreviated as V-pol and H-pol.

With the traditional approach to get all four combinations of polarizations such as cross-signal Tx V-pol and Rx H-pol and co-signals Tx V-pol and Rx V-pol and vice versa system becomes complex and expensive, normally requiring four antennas (two Rx and two Tx) and the associated drive, control, and logic circuitry. Furthermore, with a typical bistatic radar nature with Tx and Rx antennas located apart, not on the same focal point with reference to target, create technical challenges in establishing a solid reference point for signal processing.

What is needed is a system that provides the advantages of the polarized and cross polarized detection system, while decreasing system cost and complexity in a monostatic radar configuration. This system should accurately extract features of the subject-borne threat with best possible accuracy and probability.

SUMMARY

A system and method of threat detection using a pulsed polarimetric radar system using microwave range of frequencies in the electromagnetic spectrum. The system uses a radar principle to transmit and receive the scattered response from the target. A time pulsed upconverted frequency system is used to sample the target over a specified radio frequency (RF) bandwidth. The full 2-port scattering matrix (comprising all co and cross s-parameters) is captured using only one antenna, with its inherent monostatic nature, with an OMT and delay lines, that represent the target. Several decompositions are used to describe the polarimetric signature of the target.

The system uses polarimetric approaches to measure scattering properties of anomalous object concealed beneath clothing. The co-polarized and cross-polarized signals are analyzed to determine if a person is carrying an anomalous object beneath their clothing. The key differentiating and unique point to note is that this is a time-pulsed radar with upconverter and downconverter and delay lines, with a single monostatic OMT antenna, to get full co and cross signals to detect concealed threats.

BRIEF DESCRIPTION OF THE DRAWINGS

FIG. 6 is a chart summary of the analysis of the testing results.

DETAILED DESCRIPTION

The preferred embodiment is a small sensor system that can be incorporated into a covert gateway screening system. The embodiment could detect both metal and non-metal anomalous objects such as person-borne improvised explosive devices (PBIED). The embodiment could be used for secondary screening to reduce the need for a physical 'pat down' inspection of a person. The use of this system is advantageous in personnel screening applications but may also be used effectively for inspecting anomalies in packages, luggage, vehicles, or parts on an assembly line.

The preferred embodiment makes use of the microwave range of frequencies in the electromagnetic spectrum. The radiated energy is low power, short burst and focused on a subject at 2-4 meters from the system transmitter. The system is small and easily portable. The system uses a radar principle to transmit and receive the scattered response from the target. A stepped frequency system is used to sample the RF reflections from the target over a specified RF bandwidth. The full 2-port scattering matrix (s-parameters) is captured, that represent the target. Several decompositions are used to describe the polarimetric signature of the target.

In one embodiment, the system uses polarimetric approaches to measure scattering properties of anomalous object concealed beneath clothing. The co-polarized and cross-polarized signals are analyzed to determine if a person is carrying an anomalous object beneath their clothing. The body presents a relatively flat surface to the signal, with a smaller change in the polarization. More complex, denser, or metallic objects can be observed in the frequency analysis of the received signals. Objects can also cause a twist or shift in the polarization of the incoming signals, and this attribute will be detectable in the cross-polarization paths.

The preferred embodiment uses calibration procedures to fully calibrate the system hardware and record polarimetric decompositions that are representative of specific objects. The comparison. The embodiment uses signal processing to range gate to the desired target and reduce the amount of received background clutter and multi-path effects.

Furthermore, the embodiment invention uses sufficient sampling to reduce aliasing of multi-path signals. The embodiment also utilizes machine learning to produce an autonomous threat output based on the polarimetric scattering properties of the target.

Figure 1:
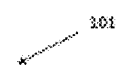
FIG. 1 is a table describing the link budget for a preferred embodiment of the system.
Figure 2:
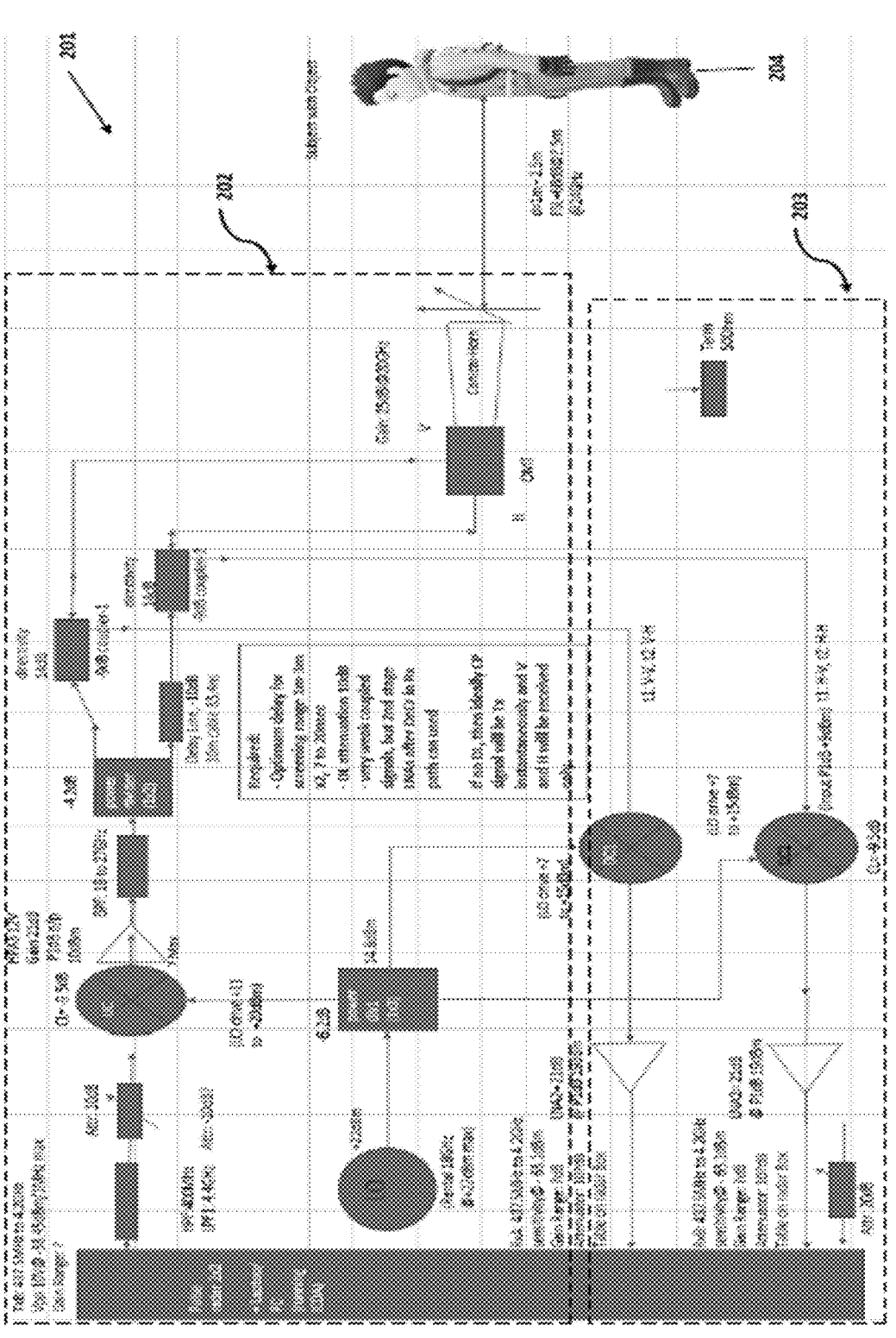
FIG. 2 is a block diagram of the overall schematic of a polarimetric radar system.

FIG. 1 is a table describing the link budget of the overall system shown in FIG. 2 with power in dBm. According to FIG. 1, the link budget 101 begins with a −38.5 dB signal, then proceeds to lose 11 and 9.5 dB through filters and mixer, to then be amplified by an additional 20 dB in element HPA3-1. The bandpass filter (BPF), power divider and 3 ft of cable attenuate 0.5 dB, 4.2 dB, and 2 dB respectively. Each antenna element in the single pol horn has a gain of 24.4 dB, yielding an effective radiated power of −21.3 dBm average, and −4.31 dBm peak at the subject. These values are important as the FCC regulates the amount of energy that can be transmitted into a human body at various frequencies. This embodiment has an advantage of being a pulse system, that keeps the average RF exposure to a relatively low level.

FIG. 2 is an overall block diagram of a polarimetric radar system. According to FIG. 2, the polarimetric radar system 201 is comprised of a Tx section 202 that creates a plurality of signals for transmission towards the subject 204. In this embodiment, a pair of signals are generated with one of the signals delayed in time. In this case, the vertical signal is minimally delayed, and the horizontal signal is delayed by use of a length of cable operating as a delay line. The horizontal signal achieves its polarity by transmitting through a horizontally oriented antenna, and the vertical signal achieves its polarity by transmitting though a vertically oriented antenna. The transmit section is described in further detail in subsequent descriptions, particularly in FIG. 3. FIG. 2 also shows the receive section 203 of the polarimetric radar system 201.

Referring to the system block diagram in FIG. 2, a pulse generated at pulse radar is upconverted and fed thru antenna port-V and radiated in air at time t1. Its backscatter from the subject received at the same port-V, coupled thru coupler-1 and down converted at DC1 is processed as V-V signal with desired time gating. However, a delayed version of the same pulse, thru the delay line, is radiated thru antenna port-H say at time t2. Its back scatter received at port-V of the antenna, coupled thru coupler-1 is processed at the same downconverter, DC1, as V-H (H-transmitted and V-received, to keep the convention of s21 s-parameters as is in the frequency domain VNA based systems) signal with desired time gating. Similarly, the signals processed at downconverter DC2 are t1 H-V and t2 H-H. This makes the system quite simple just playing with the proper time-windowed pulses in the software makes the life simple and very cost effective.

Figure 3:
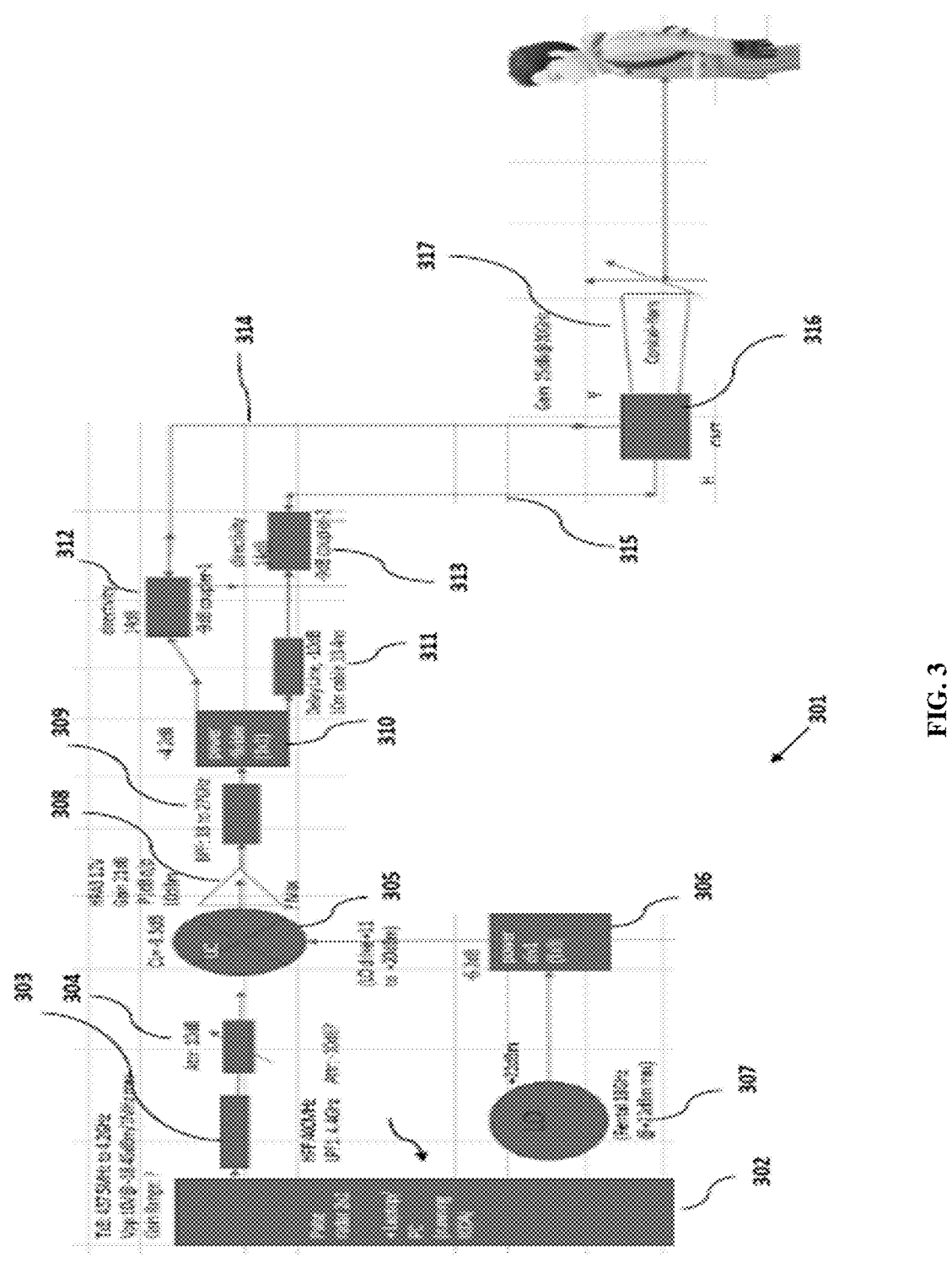
FIG. 3 is a diagram detailing the transmit section of a preferred embodiment of the system as seen in FIG. 2.

FIG. 3 is a diagram detailing the transmit section of a preferred embodiment of the system as seen in FIG. 2. According to FIG. 3, transmit section 301 comprises of pulse radar 302, high-pass filter (HPF) 303, Attr 304, UC 305, power div1 306, LO 307, HPA3 308, BPF 309, power divider 310, delay line 311, directivity 312, gain line 314, input line 315, OMT 316 and conical horn 317.

Figure 4:
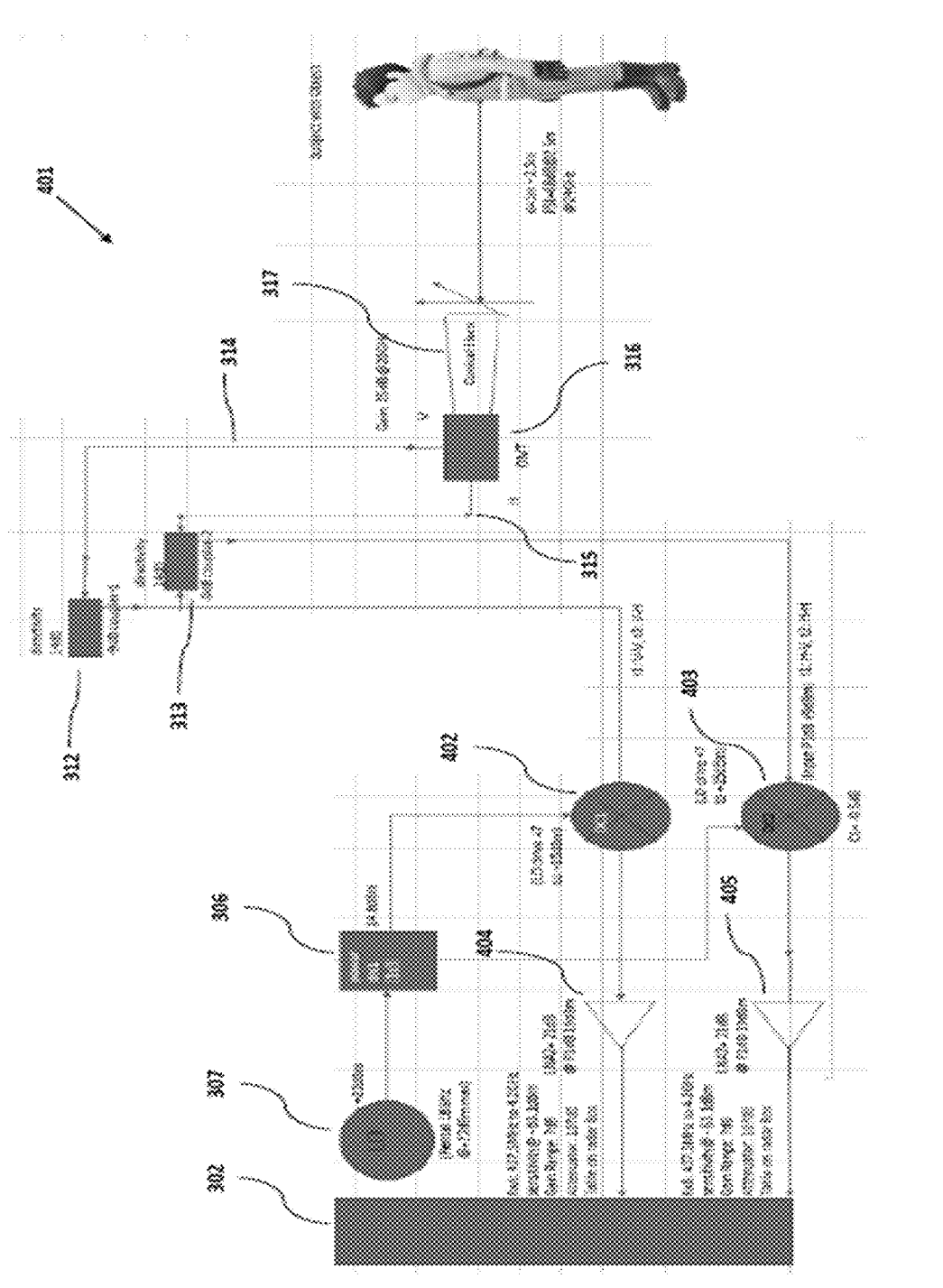
FIG. 4 is a diagram detailing the receive section of a preferred embodiment of the system as seen in FIG. 2.

FIG. 4 is a diagram detailing the receive section of a preferred embodiment of the system as seen in FIG. 2. According to FIG. 4, transmit section 401 comprises of pulse radar 302, power div1 306, LO 307, directivity 312 and 313, gain line 314, input line 315, OMT 316, conical horn 317, DC1 402, DC2 403 and LNA2 405 and 405.

According to FIG. 4, directional coupler 313 has an input from delay line 311, and output signal, and a bidirectional connection 315. One of the outputs 315 connects the 'H' or horizontal input of the OMT 316. This activates a horizontally polarized antenna that generates a horizontally polarized excitation on the 'Subject with Object' 204. The reflected signal from the subject excites both the horizontal and vertical elements of the conical-horn antenna 317, with the horizontal excitation being delayed by a time approximately equal to the time of the delay line 311. In one embodiment, the delay line is implemented as a cable with known delay characteristics for a signal to propagate from one end of the cable to the other. Other embodiments could include delay modules, RLC networks, or silicon based delay devices to implement the delay function The other output of the directional coupler 313 connects to the input of modulator DC2 403 to provide a downshift to extract the baseband signal. The output of the modulator 403 connects to a Low Noise Amplifier LNA2 405 to further amplify and condition the return signal. The output of LNA2 405 is fed to a Laptop/PC capture card 302 where the signal is digitized for analysis by the PC.

In some embodiments, the system could be implemented with the receive antennae physically separate antennas, eliminating the need for directional couplers.

According to this disclosure, requirements for a polarimetry radar system include the following:

Sweep time to capture speckle: 1 ms (needs to be shorter for faster targets)

SNR in the IF: 500 (this is for the cross, as that is weaker than co)

S-CO=0.005, S-CROSS=0.0007 (typical measured values from human body)

Operational range: 1 to 3 m (based on existing pulsed radar and upconverter/downconverter system)

Pulsed RF bandwidth 0.4 to 4.4 GHz, upconverted to 18.4 to 22.4 GHz (4 GHz)

Transmit power: −38.5 dBm approx.

Test Results

Some test results which were achieved for the detection of the person-borne improvised explosive devices (PBIEDs) are attached. The test results are summarized below.

System Specifications

According to the disclosure, the system specifications include the following:

Pulse radar, Pulsed RF bandwidth 0.4 to 4.4 GHz

Antenna+OMT (18.4-22.4 GHz)

Orthomode Transducer (OMT)

IF bandwidth 100 kHz

Data Collection

According to the disclosure, data collection was collected for the following for only the concept verification of using a single OMT antenna and is demonstrated with the help of a VNA:

Subject static with natural movements (e.g., breathing)

Items on-body under a leather jacket range: 1 m to 3 m

Antenna focused to the on-body object being tested

Features and Feature Selection

According to the disclosure, features of this test include the following:

Smoothness: ¼ $(S_{VV}+S_{HH})^2$

X-linear magnitude

Co-circular magnitude

Characteristic angle (γ)

Target size (m)

Ellipticity angle (τ)

H-α

Chi-squared method used as feature selection

Analysis

Figure 5:
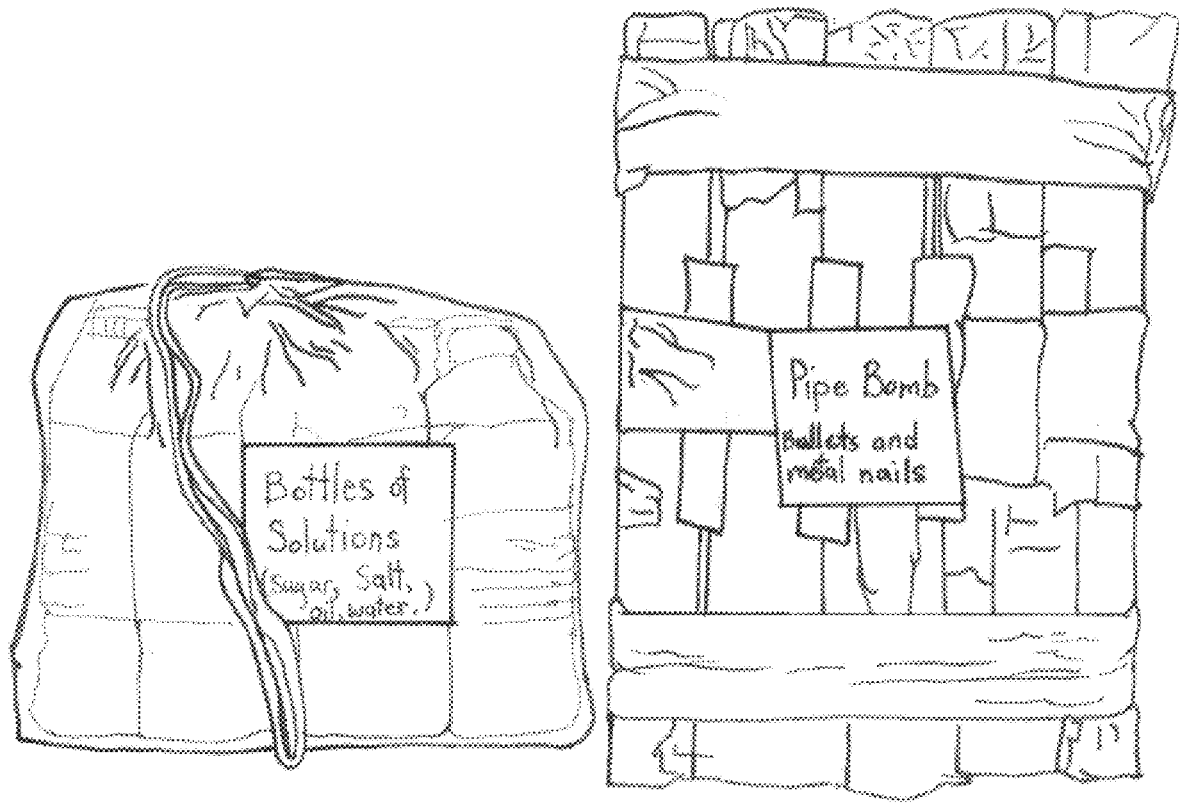
FIG. 5 is a sample mockup of a PBIEDs used in testing.

According to the disclosure, analysis of the data can be shown in FIGS. 5 to 7G. FIG. 5 is a sample mockups of PBIEDs used in testing. According to FIG. 5, the left side object is a bottle solution comprising of sugar, salt, oil and water. The right-side object Is an exemplary explosive device consisting of bullets and nails.

FIG. 6 is a chart summary of the analysis of the testing results showing a summary of analysis only for OMT antenna concept verification with the VNA. According to the FIG. 6, system calibration for both wide-band (18-26 GHz) and narrow-band (24-24.25 GHz) frequency range is turned on. Calibration matrix was obtained using a custom dihedral for OMT antenna and is applied for data processing before plotting measurement results.

Figure 7A:
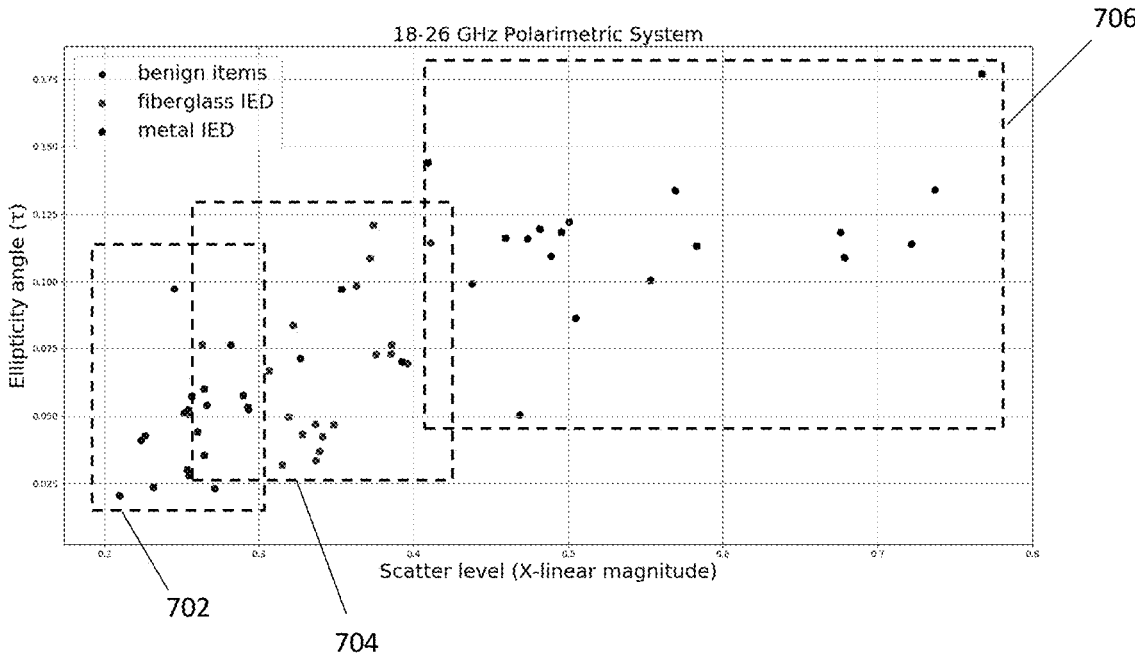
FIG. 7A is a diagram illustrating wide band—front measurements.
Figure 7A:
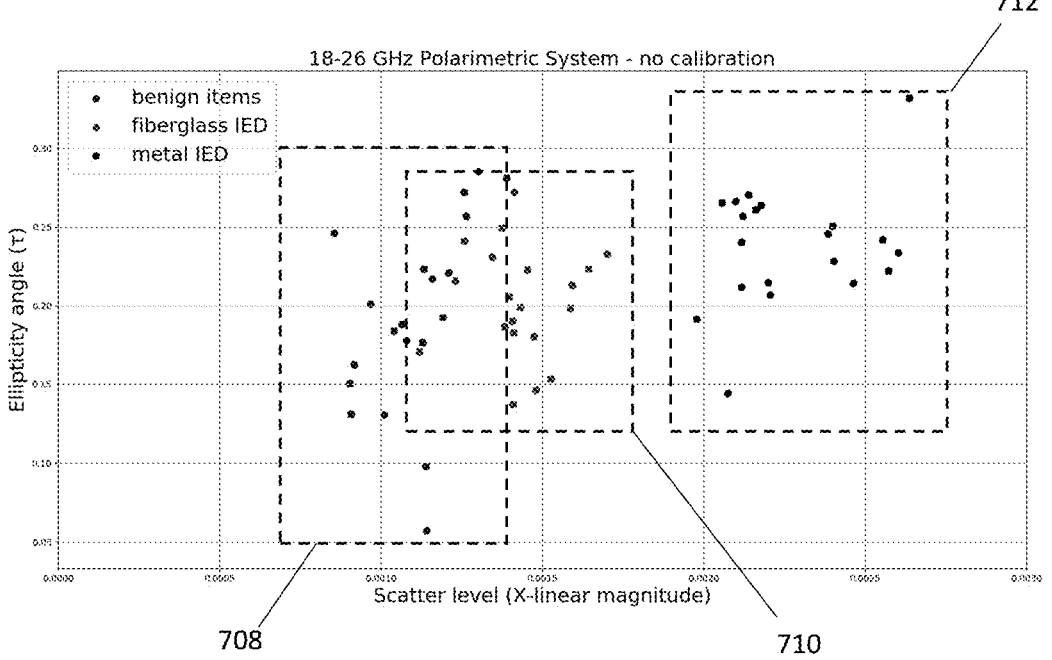

FIG. 7A is a diagram illustrating wide band—front measurements. According to FIG. 7A, the graph includes pocket clusters of benign items 702 and 708, and PPIEDs such as metal nails (IEDs) 704 and 710 and fiberglass fragments (IEDs) 706 and 712.

Figure 7B:
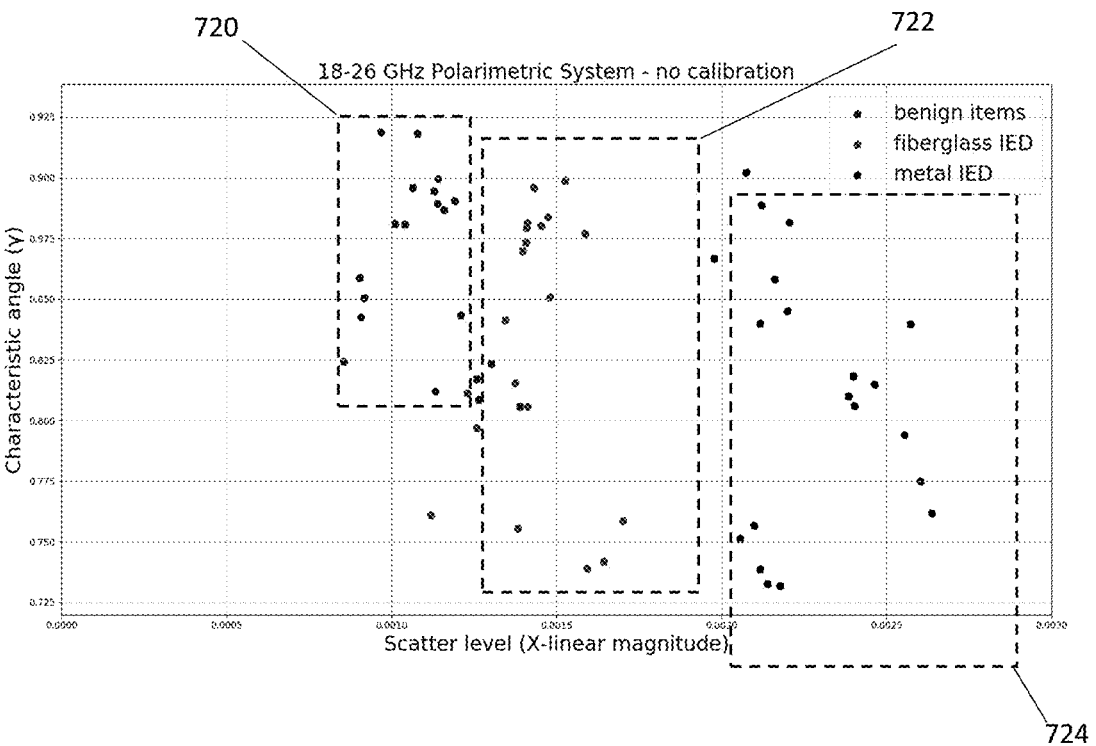
FIG. 7B is a further diagram illustrating wide band—front measurements.

FIG. 7B is a further diagram illustrating wide band—front measurements. According to FIG. 7B, pocket clusters of benign items 720, fiberglass IEDs 722 and metal IEDs 724 are shown where the characteristic angle acts better if no calibration is applied.

Figure 7C:
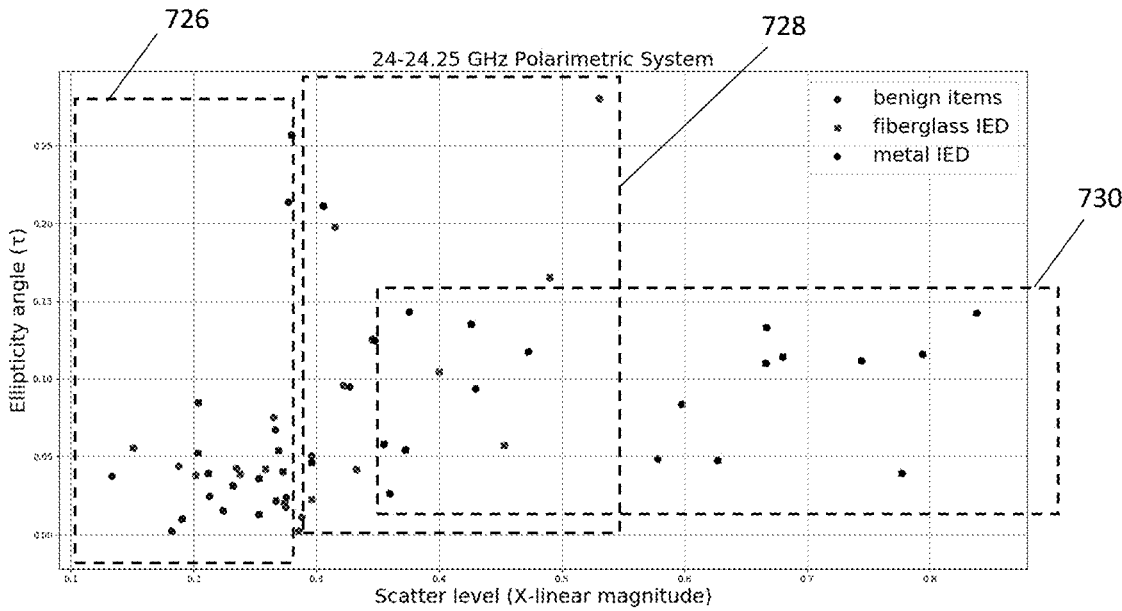
FIG. 7C is a diagram illustrating narrow ban calibrated front measurements.
Figure 7C:
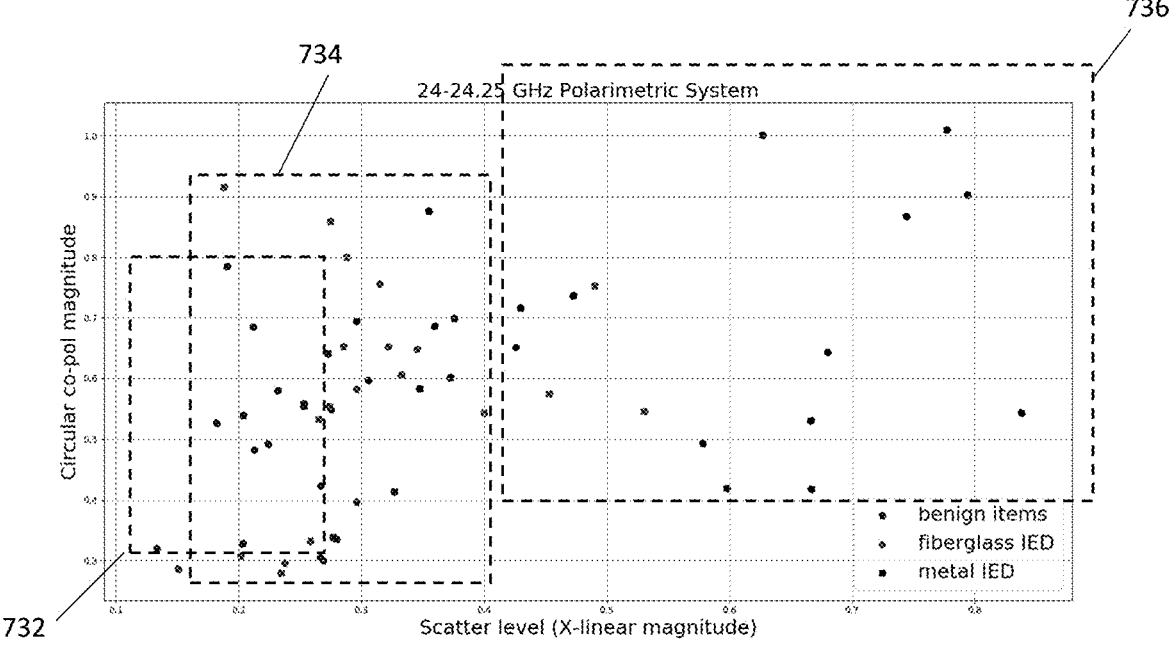

FIG. 7C is a diagram illustrating narrow ban calibrated front measurements. According to FIG. 7C, pocket clusters of benign items 726 AND 732, fiberglass IEDs 728 and 734 and metal IEDs 730 and 736 are shown. According to the disclosure, the clusters get mixed for the narrow-wand measurements. The circular co-pole magnitude is slightly better feature than the elliptically angle for narrow band.

Figure 7D:
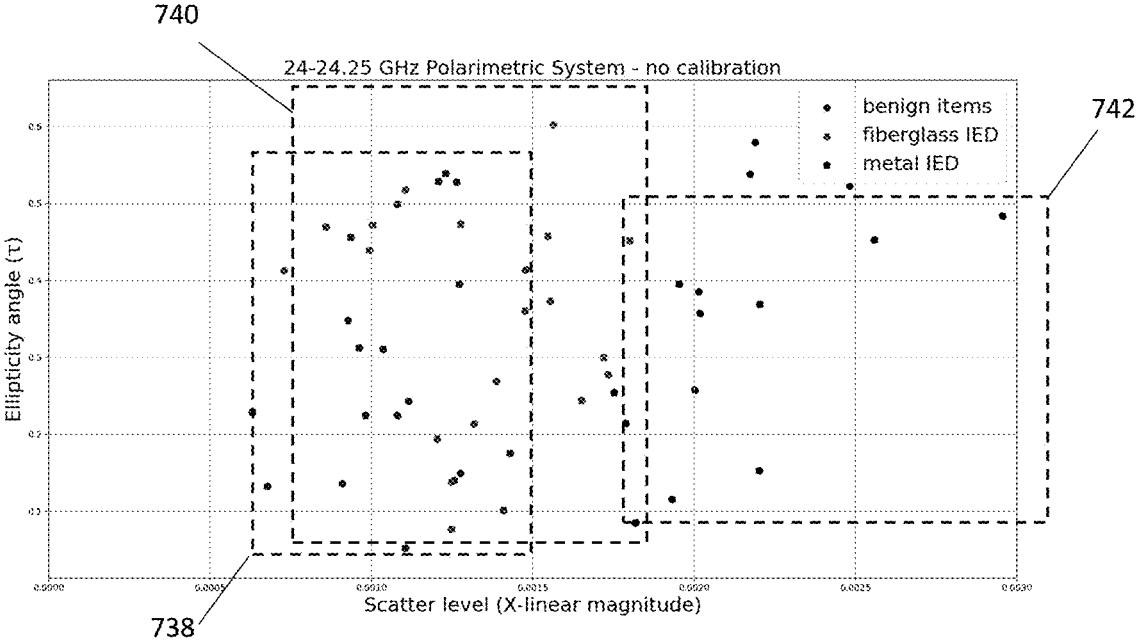
FIG. 7D is a diagram illustrating narrow ban with no calibration front measurements.
Figure 7D:
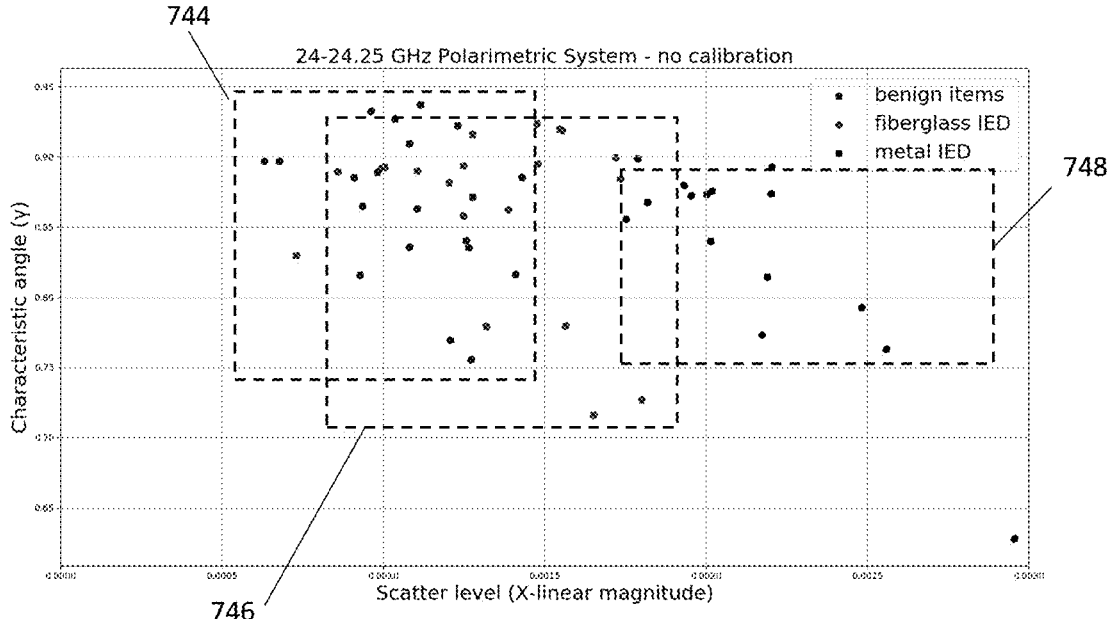

FIG. 7D is a diagram illustrating narrow ban with no calibration front measurements. According to FIG. 7D, pocket clusters of benign items 738 AND 744, fiberglass IEDs 740 and 746 and metal IEDs 742 and 748 are shown. According to the disclosure, better separation for metal nail and PBIED are compared to the calibrated plots.

Figure 7E:
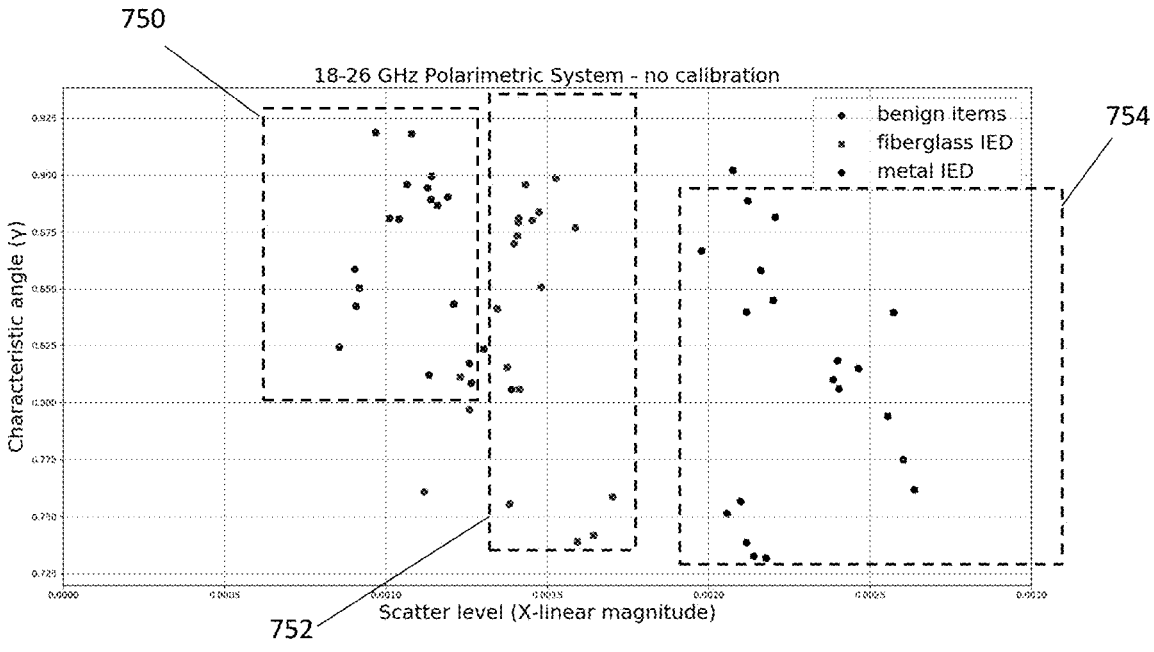
FIG. 7E is a diagram illustrating side measurements.
Figure 7E:
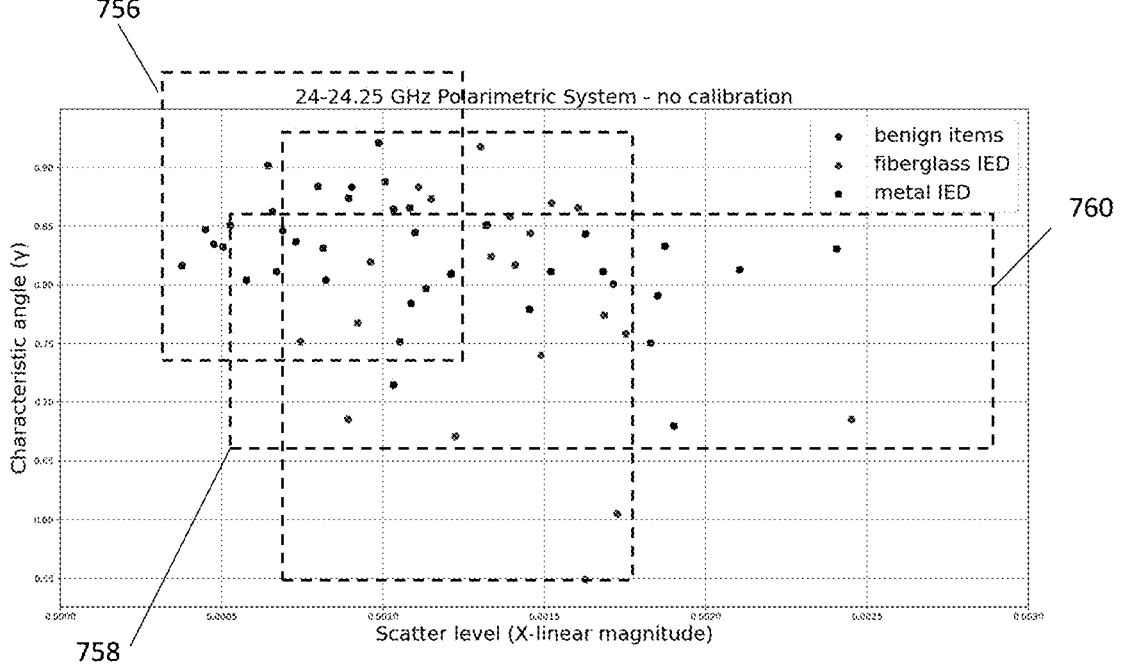

FIG. 7E is a diagram illustrating side measurements. According to FIG. 7E, pocket clusters of benign items 750 AND 756, fiberglass IEDs 752 and 758 and metal IEDs 754 and 760 are shown. According to the disclosure, there is not a good separation of metal nail PBIED for narrow band.

Figure 7G:
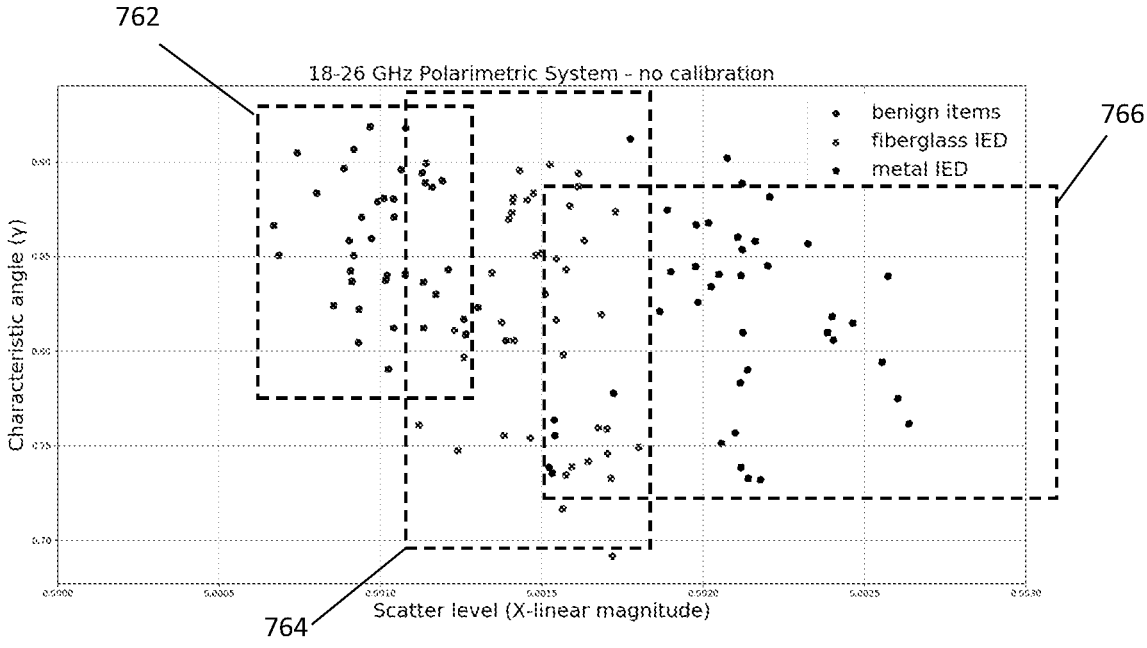
FIG. 7G is a diagram illustrating a mixed of front and back measurements.
Figure 7G:
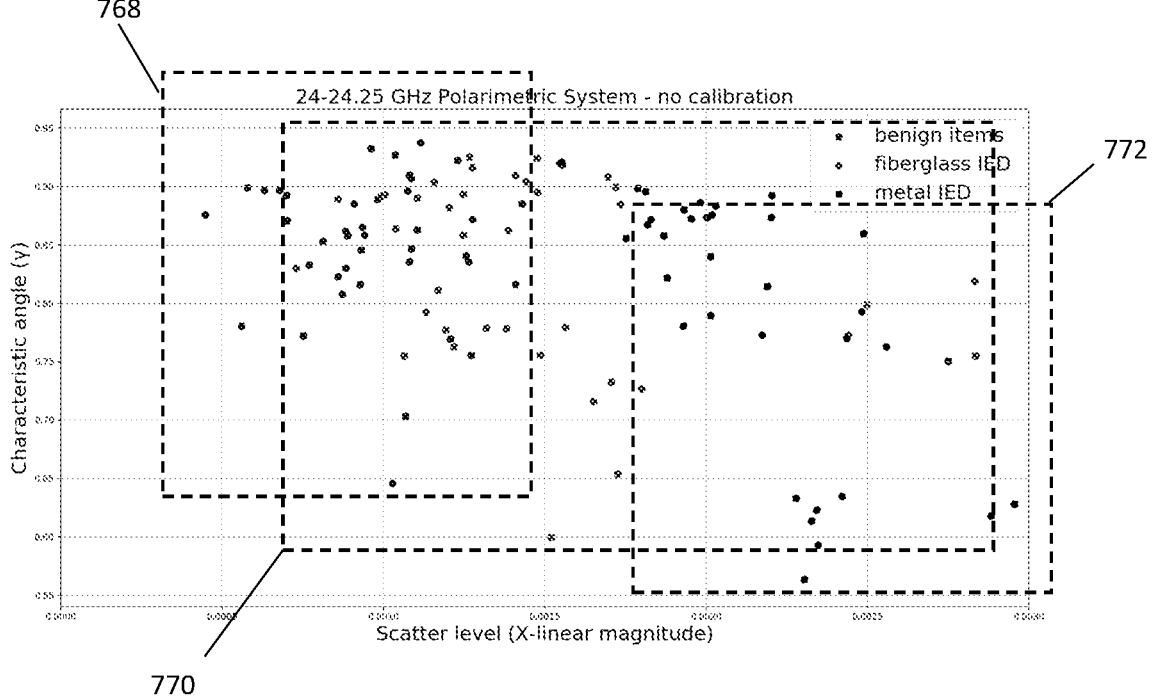

FIG. 7G is a diagram illustrating a mixed of front and back measurements. According to FIG. 7G, pocket clusters of benign items 762 AND 768, fiberglass IEDs 764 and 770 and metal IEDs 766 and 772 are shown. According to the disclosure, there is good separation for both PBIEDs (fiberglass and metal IED) for narrow band systems.

Observations

For the case of single OMT antenna use with the VNA, according to the disclosure, some observations from the tests include the following:

X-linear magnitude is a very good feature (the most reliable feature) for PBIED detection Other features may help for PBIED detection; their performance may depend on the data batch; more statistical tests on more data is required to decide on them Calibration could not add much value in terms of PBIED detection Wide-band system (no calibration applied) is the best case for both metal nail and fiberglass fragments PBIED detection especially for back and front scenarios Metal nail PBIED can be detected even with a not calibrated narrow-band system Human body is visible to the system like all RF-based systems (body posters and the part of the body illuminated by the RF waves have impact on the received signals)

Incident plane plays a big role in the level of scattering we get from on-body objects Asking for PBIEDs to be shipped (preferably) or building them Experimentation based on the most feasible conops Using VNA at the best range of the antenna (the best FCC related range if possible)

Using time domain system (faster and cheaper)

According to the disclosure, the added benefit of the up/down converter is that pulse radar's frequency spectrum can be upconverted to a variety of higher frequency bands just by changing mainly the local oscillator frequency for a variety of broad band mixers.

In another embodiment the sensor is incorporated into a system that is mounted on top of a vehicle and used to screen people on the approach. This could be deployed for use on law enforcement vehicles or military vehicles for example. In another embodiment the sensor is incorporated into a mobile/portable screening system.

According to the disclosure, a system for the detection of objects within a volume is disclosed. The system comprises a processor, a first pulsed radio-frequency (RF) signal transmitted into the volume with a vertical orientation from a first vertically oriented antenna, a second pulsed radio-frequency (RF) signal transmitted into the volume at a delay from the first pulsed RF signal with a horizontal orientation from a second horizontally oriented antenna and a received RF reflection from the object in the volume detected by the first and second antennas after the first and second pulsed RF signals According to the disclosure, the received RF reflection of the system is encoded and sent to the processor for determining the presence of objects with specific reflection characteristics in the volume. Furthermore, the delay of the second pulsed RF signal from the first pulsed RF signal is created by providing a cable of a specific length between the horizontally and vertically oriented antennae as a delay line.

According to the disclosure, the identification of the object of the system is performed by using the scatter patterns on a Scatter Angle VS Scatter level for similarity with reference objects of the identified type. The object being identified is a Pipe Bomb Improvised Explosive Device (PBIED).

According to the disclosure, at least one of the horizontal-to-horizontal antenna scatter signals, the vertical-to-vertical scatter signals, and the horizontal to vertical scatter signals and the vertical to horizontal scatter signals are used for object detection analysis. Furthermore, delay element of the system is implemented using at least one of a delay module, RLC network, or silicon-based delay devices and the frequency range of the pulsed RF signal of the system is in the 18-26 GHz band or in the 24-24.5 GHz frequency band.

According to the disclosure, computer-implemented method consisting of a computer processor for the detection of objects within a volume is disclosed. The computer-implemented method comprises the steps of transmitting a first pulsed radio-frequency (RF) signal into the volume with a vertical orientation from a first vertically oriented antenna, transmitting a second pulsed radio-frequency (RF) signal into the volume at a delay from the first pulsed RF signal with a horizontal orientation from a second horizontally oriented antenna, receiving received radio-frequency (RF) reflection from the object in the volume detected by the first and second antennas after the first and second pulsed RF signals, encoding the received RF reflection, determining the presence of objects with specific reflection characteristics in the volume and creating a delay of the second pulsed RF signal from the first pulsed RF signal is by providing a cable of a specific length between the horizontally and vertically oriented antennae as a delay line.

According to the disclosure, the method further comprises the step of identification of the object performed by using the scatter patterns on a Scatter Angle VS Scatter level for similarity with reference objects of the identified type. The object being identified by the method is a Pipe Bomb Improvised Explosive Device (PBIED).

According to the disclosure, at least one of the horizontal-to-horizontal antenna scatter signals, the vertical-to-vertical scatter signals, and the horizontal to vertical scatter signals and the vertical to horizontal scatter signals are used for object detection analysis for the method. The delay element of the method is implemented using at least one of a delay module, RLC network, or silicon-based delay devices. Furthermore, the frequency range of the pulsed RF signal of the method is in the 18-26 GHz band or in the 24-24.5 GHz frequency band.

Implementations disclosed herein provide systems, methods, and apparatus for generating or augmenting training data sets for machine learning training. The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. It should be noted that a computer-readable medium may be tangible and non-transitory. As used herein, the term "code" may refer to software, instructions, code, or data that is/are executable by a computing device or processor. A "module" can be considered as a processor executing computer-readable code.

A processor as described herein can be a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, or microcontroller, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. In some embodiments, a processor can be a graphics processing unit (GPU). The parallel processing capabilities of GPUs can reduce the amount of time for training and using neural networks (and other machine learning models) compared to central processing units (CPUs). In some embodiments, a processor can be an ASIC including dedicated machine learning circuitry custom-build for one or both of model training and model inference.

The disclosed or illustrated tasks can be distributed across multiple processors or computing devices of a computer system, including computing devices that are geographically distributed. The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on." While the foregoing written description of the system enables one of ordinary skill to make and use what is considered presently to be the best mode thereof, those of ordinary skill will understand and appreciate the existence of variations, combinations, and equivalents of the specific embodiment, method, and examples herein. The system should therefore not be limited by the above-described embodiment, method, and examples, but by all embodiments and methods within the scope and spirit of the system. Thus, the present disclosure is not intended to be limited to the implementations shown herein but is to be accorded the widest scope consistent with the principles and novel features disclosed herein.

What is claimed:

1. A system for the detection of objects within a volume, comprising:
    a processor;
    a first pulsed radio-frequency (RF) signal transmitted into the volume with a vertical orientation from a first vertically oriented antenna;
    a second pulsed radio-frequency (RF) signal transmitted into the volume at a delay from the first pulsed RF signal with a horizontal orientation from a second horizontally oriented antenna; and
    a received RF reflection from the object in the volume detected by the first and second antennas after the first and second pulsed RF signals;

wherein the frequency range of the pulsed RF signals is within both 18-26 GHz or 24.24-25 GHz frequency band;

wherein the received RF reflections are sent to the processor only when simultaneously received from both the first and second antennas within a calibrated time delay window, and wherein the processor performs object classification based on the comparison of a polarimetric scatter signature of the received reflections with a set of calibrated threat-specific polarimetric scatter signatures corresponding to known hazardous objects including metallic improvised explosive devices (IEDs), and wherein the processor is further configured to calibrate said polarimetric scatter signature by compensating for phase delay and amplitude imbalance between the received vertical and horizontal signals.

2. The system of claim 1, wherein the identification of the object is performed by using the scatter patterns on a Scatter Angle VS Scatter level for similarity with reference objects of the identified type.

3. The system of claim 1, wherein wherein at least one of the threat-specific polarimetric scatter signatures corresponds to a person carrying a personal borne improvised explosive device (PBIED), and wherein said classification comprises applying a trained neural network to the polarimetric scatter signature to identify said PBIED.

4. The system of claim 1 wherein at least one of the horizontal-to-horizontal antenna scatter signals, the vertica-to-vertical scatter signals, and the horizontal-to-vertical scatter signals and the vertical-to-horizontal scatter signals are used for object detection analysis.

5. The system of claim 1 wherein the delay element is implemented using at least one of a delay module, RLC network, or silicon-based delay devices.

6. A computer-implemented method comprising a computer processor for the detection of objects within a volume, the method comprising the steps of:

transmitting a first pulsed radio-frequency (RF) signal into the volume with a vertical orientation from a first vertically oriented antenna;

transmitting a second pulsed radio-frequency (RF) signal into the volume at a delay from the first pulsed RF signal with a horizontal orientation from a second horizontally oriented antenna;

receiving received radio-frequency (RF) reflection from the object in the volume detected by the first and second antennas after the first and second pulsed RF signals, encoding the received RF reflection;

determining the presence of objects with specific reflection characteristics in the volume; and creating a delay of the second pulsed RF signal from the first pulsed RF signal is by providing a cable of a specific length between the horizontally and vertically oriented antennae as a delay line;

wherein the frequency range of the pulsed RF signals is within a 18-26 GHz or a 24.24-25 GHz frequency band;

wherein the received RF reflections are sent to the processor only when simultaneously received from both the first and second antennas within a calibrated time delay window, and wherein the processor performs object classification based on the comparison of a polarimetric scatter signature of the received reflections with a set of calibrated threat-specific polarimetric scatter signatures corresponding to known hazardous objects including metallic improvised explosive devices (IEDs), and wherein the processor is further configured to calibrate said polarimetric scatter signature by compensating for phase delay and amplitude imbalance between the received vertical and horizontal signals.

7. The method of claim 6 further comprising the step of identification of the object performed by using the scatter patterns on a Scatter Angle VS Scatter level for similarity with reference objects of the identified type.

8. The method of claim 6, wherein at least one of the threat-specific polarimetric scatter signatures corresponds to a person carrying a personal borne improvised explosive device (PBIED), and wherein said classification comprises applying a trained neural network to the polarimetric scatter signature to identify said PBIED.

9. The method of claim 6 wherein at least one of the horizontal-to-horizontal antenna scatter signals, the vertical-to-vertical scatter signals, and the horizontal-to-vertical scatter signals and the vertical-to-horizontal scatter signals are used for object detection analysis.

10. The method of claim 6 wherein the delay element is implemented using at least one of a delay module, RLC network, or silicon-based delay devices.

* * * * *